(12) United States Patent
Mueller-Niehuus et al.

(10) Patent No.: US 9,845,880 B2
(45) Date of Patent: Dec. 19, 2017

(54) SEALING RING AND USE THEREOF

(71) Applicant: Carl Freudenberg KG, Weinheim (DE)

(72) Inventors: Kristian Mueller-Niehuus, Frankfurt (DE); Hans-Werner Guenther, Drakenburg (DE)

(73) Assignee: CARL FREUDENBERG KG, Weinheim (DE)

( * ) Notice: Subject to any disclaimer, the term of this patent is extended or adjusted under 35 U.S.C. 154(b) by 0 days.

(21) Appl. No.: 14/831,882

(22) Filed: Aug. 21, 2015

(65) Prior Publication Data

US 2016/0053894 A1 Feb. 25, 2016

(30) Foreign Application Priority Data

Aug. 22, 2014 (DE) .................. 10 2014 012 290

(51) Int. Cl.
*F16J 15/3208* (2016.01)
*F16J 15/3212* (2016.01)
*F16J 15/322* (2016.01)

(52) U.S. Cl.
CPC ......... *F16J 15/3208* (2013.01); *F16J 15/322* (2013.01); *F16J 15/3212* (2013.01)

(58) Field of Classification Search
CPC ...... F16J 15/32; F16J 15/3204; F16J 15/3208; F16J 15/3236
See application file for complete search history.

(56) References Cited

U.S. PATENT DOCUMENTS

| | | | | |
|---|---|---|---|---|
| 2,760,802 A | * | 8/1956 | Haley ................. | F16J 15/3212 277/561 |
| 3,521,890 A | * | 7/1970 | Holmes ............... | F16J 15/3208 277/551 |
| 3,891,488 A | * | 6/1975 | White .................. | B29C 70/347 156/170 |
| 4,171,818 A | * | 10/1979 | Moskowitz ........... | F16J 15/324 277/410 |
| 5,202,536 A | * | 4/1993 | Buonanno ........... | H05K 9/0015 174/356 |

(Continued)

FOREIGN PATENT DOCUMENTS

| | | |
|---|---|---|
| DE | 6920048 U | 8/1969 |
| DE | 3714674 A1 | 11/1988 |
| FR | 2614383 A1 | 10/1988 |

*Primary Examiner* — Vishal Patel
*Assistant Examiner* — L. Susmitha Koneru
(74) *Attorney, Agent, or Firm* — Leydig, Voit & Mayer, Ltd.

(57) ABSTRACT

A sealing ring with a dynamically loaded sealing lip having a sealing edge and a tension element for stabilizing the sealing lip in the radial direction, wherein: the tension element is arranged in a mounting groove; the mounting groove is arranged in the sealing lip on the side facing radially away from the sealing edge and has a mounting opening on the side facing radially away from the sealing edge, which opening is delimited by two guide webs arranged so as to be adjacent to each other at a spacing in the axial direction; the sealing lip is articulated, on its side facing axially away from the sealing edge, to a support member with a joint; and the sealing lip and the support member delimit, with their sides which radially face each other, a substantially C-shaped joint space which is open on one side in the axial direction.

13 Claims, 2 Drawing Sheets

(56) References Cited

U.S. PATENT DOCUMENTS

| | | | | |
|---|---|---|---|---|
| 6,173,970 B1* | 1/2001 | Choudary | .............. | F16J 15/028 |
| | | | | 277/644 |
| 2008/0001365 A1* | 1/2008 | Lequire | ................ | F16J 15/3276 |
| | | | | 277/560 |
| 2013/0307222 A1* | 11/2013 | Von Bergen | ......... | F16J 15/3212 |
| | | | | 277/553 |

* cited by examiner

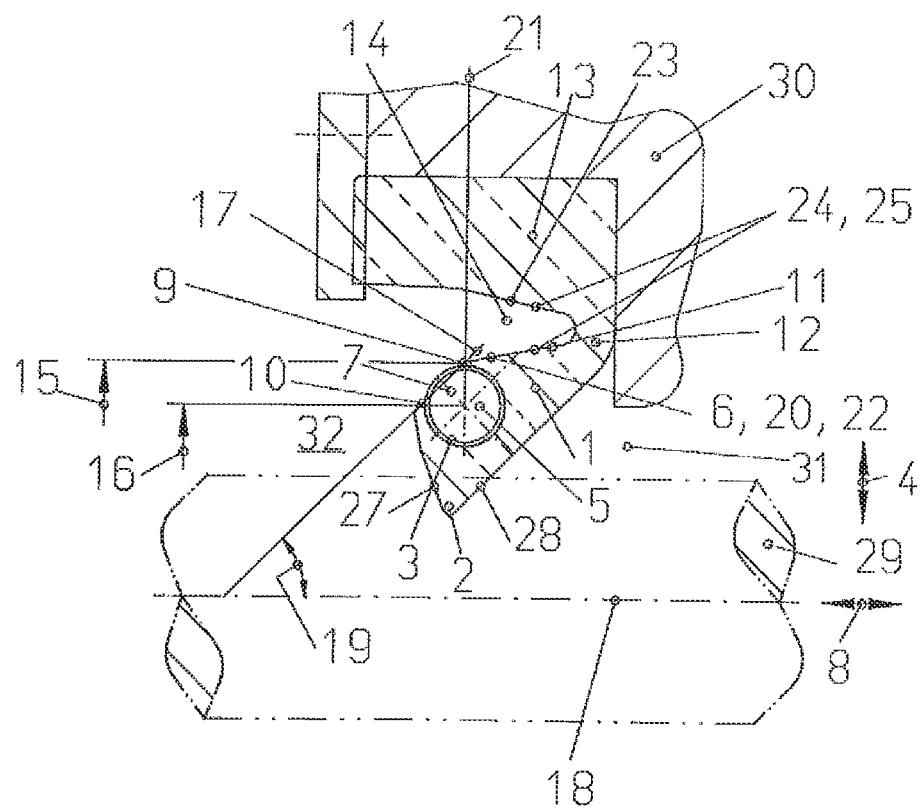

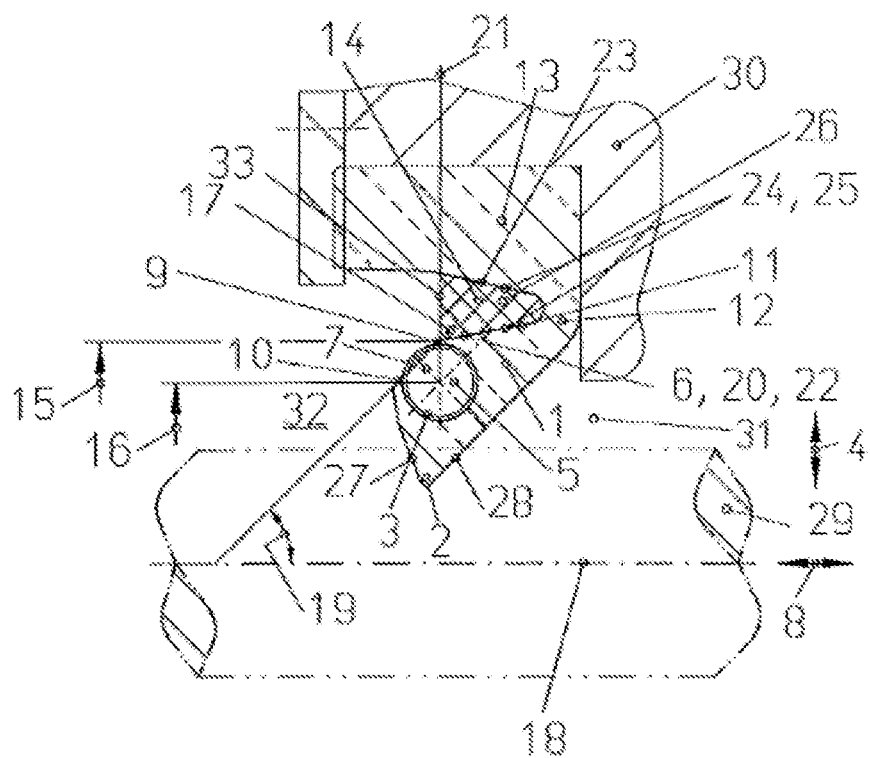

SEALING RING AND USE THEREOF

CROSS-REFERENCE TO RELATED APPLICATIONS

Priority is claimed to German Patent Application No. DE 10 2014 012 290.5, filed on Aug. 22, 2014, the entire disclosure of which is hereby incorporated by reference herein.

FIELD

The invention relates to a sealing ring.

BACKGROUND

A sealing ring of this type is generally known and is used as a radial shaft seal. One known seal arrangement comprises a sealing ring of this type, the sealing edge of which sealingly surrounds a surface to be sealed of a first machine element to be sealed, for example a shaft. The sealing ring is arranged in a second machine element, for example in a groove in a housing, by means of its support member, the housing surrounding the shaft at a radial spacing. The medium to be retained by the sealing ring is often an oil. Known radial shaft seals are used, for example, to seal gear shafts which pass through transmission housings. The medium to be retained in such a case is thus gear oil. In the known radial shaft seals, the sealing lip and their sealing edge often consist of an elastomer material. The sealing arrangement described above is optimized for a tribological pairing "elastomer-oil-metal surface to be sealed". The guide webs which delimit either side of the mounting opening for the tension element in the axial direction have substantially matching diameters, the surface of the sealing lip, facing radially away from the surface to be sealed, also extending substantially only in the axial direction and in parallel with the surface to be sealed.

SUMMARY

An aspect of the invention provides a sealing ring, comprising: a dynamically loaded sealing lip including a sealing edge and a tension element, wherein the tension element is configured to stabilize the sealing lip in the radial direction, wherein the tension element is arranged in a mounting groove, wherein the mounting groove is arranged in the sealing lip on a side facing radially away from the sealing edge, wherein the mounting groove includes a mounting opening on the side facing radially away from the sealing edge, wherein the mounting opening is delimited by a first and a second guide webs, wherein the guide webs are arranged so as to be adjacent to each other at a spacing in an axial direction, wherein the sealing lip is articulated, on a side facing axially away from the sealing edge, to a support member using a joint, and wherein the sealing lip and the support member delimit, with their sides which radially face each other, a substantially C-shaped joint space, wherein the joint space is open on a side in the axial direction, wherein the first guide web, axially facing the joint, has a first diameter, wherein the second guide web, facing axially away from the joint, has a second diameter, and wherein the first diameter is larger than the second diameter.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 shows a first embodiment comprising an empty joint space for manufacturing reasons, FIG. 2 shows a second embodiment, similar to the embodiment in FIG. 1, the joint space being substantially completely filled by a foam member.

DETAILED DESCRIPTION

An aspect of the invention provides a sealing ring comprising a dynamically loaded sealing lip having a sealing edge and a tension element for stabilizing the sealing lip in the radial direction, the tension element being arranged in a mounting groove, the mounting groove being arranged in the sealing lip on the side which faces radially away from the sealing edge and having a mounting opening in the side which faces radially away from the sealing edge, which opening is delimited by two guide webs which are arranged so as to be adjacent to one another at a spacing in the axial direction, the sealing lip being articulated, on its side facing axially away from the sealing edge, to a support member by means of a joint and the sealing lip and support member delimiting, with their sides which radially face each other, a substantially C-shaped joint space which is open on one side in the axial direction.

An aspect of the invention addresses developing a sealing ring of the type mentioned at the outset such that the medium to be retained can be formed by a grease and such that the sealing ring can also have good performance characteristics during a long service life even when retaining a medium of this type, in particular such that retaining such a medium does not cause the seal to harden and such that the sealing lip is able to track high dynamic deflection movements of the machine element to be sealed, even when retaining such a medium, without significant changes to the contact pressure with which the sealing edge sealingly contacts the machine element to be sealed.

An aspect of the invention provides for the first guide web, which axially faces the joint, to have a first diameter, for the second guide web, which faces axially away from the joint, to have a second diameter, and for the first diameter to be larger than the second diameter.

In this regard, it is advantageous for the sealing lip to extend, at least in the region of the mounting opening for the tension element, obliquely to the axial extension of the surface to be sealed of the machine element to be sealed, such that the substantially C-shaped joint space has a larger radial width on the side facing axially away from the joint. Preferably, the radial width of the joint space continuously widens axially, starting from the joint, towards the opening at the front end of the joint space. Owing to the comparatively large volume of the joint space, the amount of medium to be retained that accumulates is insufficient for said medium to cause the seal to harden. The two differently sized diameters of the two guide webs already ensure that the joint space continuously widens axially in the radial direction towards its open end face. Therefore, not even grease, which is significantly more viscous than oil, can remain in the joint space during the proper use of the sealing ring, and so the sealing lip can also readily follow high dynamic deflection movements of the machine element to be sealed, for example a shaft, while the bearing stress of the sealing edge on the surface to be sealed remains practically constant.

Good performance characteristics of the sealing ring over a long service life, in particular the prevention of grease from accumulating in the joint space of the sealing ring, can be achieved if the first guide web and the second guide web, when viewed in a section through the sealing ring, are connected in each case at their outer circumference by an oblique, imaginary connection plane, the connection plane enclosing an angle of between 30° and 60° with an axis of symmetry of the sealing ring. The axis of symmetry of the sealing ring extends in the same axial direction as the surface to be sealed of a machine element to be sealed, for example a shaft.

The above-mentioned angles mean, on the one hand, that the sealing lip has a sufficiently large extension in the axial direction to be able to accommodate the tension element, and, on the other hand, that the upper side of the sealing lip, facing radially away from the machine element to be sealed, has a sufficiently large slope for even viscous sealing grease to flow out of the joint space towards the space to be sealed.

The surface of the sealing lip radially facing the support member can become continuously smaller axially, starting from the joint, towards the first guide web. Even if sealing grease accumulates for a short time within the joint space, this grease flows consistently out of the joint space towards the space to be sealed as a result of the above-mentioned design, and therefore the resilient flexibility of the sealing lip in the radial direction is not impaired by medium, which is to be retained, being located in the joint space, and the sealing lip can therefore follow high dynamic deflection movements of the machine element to be sealed. The deflection movements of the machine element to be sealed can in any case be in the range of ±5 mm.

In the process, the bearing stress with which the sealing edge surrounds the surface to be sealed is practically always constant.

The support member can be penetrated by an imaginary radial plane extending through the first guide web, the joint space, when viewed perpendicularly to the radial plane, being substantially symmetrical in the radial direction. Uncoordinated dripping of the medium to be retained is prevented by the symmetrical shape of the joint space. Medium to be retained, which is flung radially outwards from the machine element to be sealed and settles on the surface of the support member radially facing the sealing lip, first moves towards the joint owing to the slope of said surface, and then, owing to the substantially corresponding slope, moves from the joint, past the tension element, along the outer circumference of the sealing lip back towards the space to be sealed.

If necessary, the support member can be in the form of a stabilizing sheathing which consists, for example, of a woven fabric.

To ensure that even highly viscous medium to be retained, for example a grease, is reliably conducted out of the joint space, it can be provided for the sealing lip and the support body to have surfaces which face each other and have a friction-reducing surface profiling and/or a friction-reducing surface coating. The greater the viscosity of the medium to be retained, the more effective the measures have to be to make the medium to be retained flow out of the joint space. The surface profiling and/or the surface coating can be applied to said surfaces during production and/or thereafter.

For example, oleophilic, oleophobic, hydrophilic or hydrophobic coatings can be applied, it being possible to apply said coatings by painting, plasma treatment or evaporation deposition.

Oleophilic coatings strip some oil from the grease, and the oil is left in situ. This creates an oily film, along which the highly viscous grease can slide.

An oleophobic coating produces an effect similar to the Lotus effect. The surface bonding forces between the grease and the sealing edge are reduced and so the grease can slide along the coated surface with low friction.

Depending on production and use, grease always contains a certain proportion of water, which can also be used as a substance for creating a film for the purpose of friction reduction.

A hydrophilic coating strips some water from the grease, and the water is left in situ. This creates an aqueous film, along which the highly viscous grease can slide.

A hydrophobic coating produces an effect similar to the Lotus effect. The surface bonding forces between the grease and the sealing edge are reduced and so the grease can slide along the coated surface with low friction.

As a result of spraying, the coating can be deposited simply both during and after the production of the sealing ring.

The advantage of a plasma activation is that the aforementioned effects can be produced by targeted modification of the surface energy on the upper side of the material used. Another advantage is that use is made only of the material used, and therefore no stability analyses have to be carried out between the material, coating and grease.

Evaporation deposition has the advantage that surface coating materials can be applied in a very thin layer and in a favorable manner in terms of resources.

Surface structures can be produced mechanically by recesses or raised portions, it being possible for an embossed structure to have a scaled pattern, geometric patterns, burls, diamonds or grooves.

Said embossed structures all have the same advantage that sliding is only possible in one direction when said structures are aligned correspondingly. For example, with scales, sliding is made simpler in the coating direction and is impeded counter to the stroke.

With an appropriate design, the surface contact can be reduced. For example with burls or diamonds, the grease only adheres to the raised portions, and therefore the sliding friction is reduced as a result and the grease can flow more simply on the surface.

In addition, the grease flowing away can, for example, be guided or channelled by an arrow structure on the surface.

For media to be retained that have particularly high viscosity, the surfaces have both a surface profiling and a surface coating. The discharge of the medium to be retained out of the joint space is thus particularly effective.

The joint space can be substantially completely filled by a foam member between the mutually facing surfaces of the sealing lip and support member. The advantage of such a design is that there is no need for a surface profiling and/or a surface coating of the mutually facing surfaces of the sealing lip and support member, and therefore the overall production of the sealing ring is simple and inexpensive. The foam member ensures that medium to be retained cannot enter the joint space during the service life of the sealing ring. The foam member is sufficiently compressible so as to not negatively impact the performance characteristics of the sealing ring, in particular the radial flexibility of the sealing lip.

The foam member can preferably consist of a closed-cell foam. It is advantageous here for the medium to be retained to not be able to enter the foam member. The compressibility of the foam member is thus always constant, and therefore the resilient flexibility of the sealing lip in the radial direction is likewise practically constant over a long service life.

According to an advantageous embodiment, it can be provided for the sealing edge to be defined by two intersecting conical surfaces. Sealing edges which are defined by two intersecting conical surfaces are generally known, it being possible for the conical surfaces to be at different angles to the axis of symmetry of the sealing ring depending on the respective application. It is often the case that the conical surface arranged axially in the direction of the space to be sealed defines a larger angle with the axis of symmetry than the conical surface facing axially away from the space to be sealed.

Depending on the respective application, the sealing edge can have a radius. The advantage of a sealing edge radius is that the angular relationship between the conical surfaces of the sealing edge is maintained in a wide radial deflection range of the machine element to be sealed, unlike with sealing edges formed with sharp edges where the angular configuration constantly varies.

It is also possible for the sealing edge to comprise a return-feed spiral for conveying the medium to be retained back into the space to be sealed.

The tension element can be formed as an annular spiral coiled spring. Tension elements are generally used when the contact pressure inside the space to be sealed is so low as to only press the sealing lip against the surface to be sealed of the machine element to be sealed with an insufficiently large contact pressure in the radial direction. To exclude the possibility of leaks in the sealing ring when the contact pressure is low in the space to be sealed, as a result of the sealing edge being pressed inadequately onto the surface to be sealed, the tension element is provided and surrounds the sealing edge radially around the outer circumference. The tension element can, for example, be formed by the aforementioned annular spiral coiled spring or by other suitable springs, and likewise by a cable, a cord, a strip, a profiled strip or a woven fabric.

An annular spiral coiled spring is simple to produce and has a constant contact-pressure distribution and a constant spring force, even when the sealing lip is designed with large radial dimensions, because the annular spiral coiled spring is arranged in a floating manner in the mounting groove.

Suitable springs can, for example, be formed by finger springs, in which the spring force is independent of diameter, the finger springs being usable in a segmented design.

Unlike annular spiral coiled springs, canted coil springs have an almost constant spring force over a large diameter range, even when not mounted in a floating manner.

Cables, cords, strips, profiled strips or woven fabrics are used if the intention is to reduce the contact pressure if the diameter of the sealing edge is made somewhat larger owing to operational material wear. The above-mentioned tension elements do not have an adjustable spring force, like annular spiral coiled springs for example. The above-mentioned contact pressure reduction minimizes the wear to the sealing edge.

With the exception of the tension element, the sealing ring can be formed in one piece and of one material. The sealing ring thus has a simple design and is inexpensive to produce. Furthermore, it is easier to recycle the sealing ring at the end of its service life. Sealing materials which can be used can be polymers or elastomers such as NBR, HNBR, FKM, EPDM or PTFE, PU.

NBR is a standard material which is available inexpensively with different specifications.

HBNR is resistant to environmental influences, such as ozone, and is suitable for producing complete seals.

FKM has high resistance to chemicals and high temperature limits. Sealing edges made of such a material have particularly advantageous performance characteristics.

EPDM is used for sealing rings in safety areas which require an aqueous lubricant. A material of this type is well suited to complete seals.

PTFE is highly resistant to wear and can thus be used particularly effectively as a sealing edge material.

PU materials are particularly well suited to machining production. This creates the possibility of implementing surface structure geometries.

According to another embodiment, it can be provided for the support member to consist of a different material from the sealing lip. A two-component sealing ring of this type is advantageous in that both the support member and the sealing lip can be particularly well adapted to the respective application independently of one another.

Furthermore, the invention relates to the use of a sealing ring as described above.

Owing to the specific design of the joint space, which allows even highly viscous media, which are to be retained, to flow out towards a space to be sealed, a sealing ring of this type is used to retain grease.

FIGS. 1 and 2 each show a seal arrangement in which the sealing ring according to the invention is used. The seal arrangement comprises two machine elements 29, 30 to be sealed, the first machine element to be sealed 29 being formed by a shaft and the second machine element 30 to be sealed being formed by a housing which surrounds the shaft at a radial spacing. The sealing ring according to the invention, which is in the form of a radial shaft seal and is used as a wind turbine main bearing seal for retaining grease, is arranged in the gap 31 formed by the radial spacing.

The sealing ring comprises the dynamically loaded sealing lip 1 which has a sealing edge 2, the sealing edge 2 being defined by two intersecting conical surfaces 27, 28 in the embodiments shown here. The sealing edge 2 is radially surrounded around its outer circumference by the tension element 3, the tension element 3 being formed by an annular spiral coiled spring in the embodiments shown. The tension element 3 is arranged in the mounting groove 5 which is arranged in the side 6 of the sealing lip 1 facing radially away from the sealing edge 2. The mounting groove 5 has a mounting opening 7 for the tension element 3. The mounting opening 7 is delimited in the axial direction 8 by two guide webs 9, 10 which are arranged so as to be adjacent to one another at an axial spacing in the axial direction 8 and have different diameters 15, 16.

The sealing lip 1 is articulated to the support member 13 by the joint 12, in particular so as to be resiliently flexible in the radial direction 4. The joint space 14, which is defined by the joint 12 and the mutually facing surfaces 22, 23 of the sealing lip 1 and support body 13, is substantially C-shaped and open on the side facing axially away from the joint 12.

The first guide web 9 axially facing the joint 12 has a first diameter 15 which is larger than the second diameter 16 of the second guide web 10, which is arranged on the side of the sealing lip 1 facing axially away from the joint 12.

The imaginary connection plane 17, which interconnects the outer circumferences of the two guide webs 9, 10, encloses, in the embodiment shown here, the angle 19 of between 30° and 60° with the axis of symmetry 18 of the sealing ring.

The surface 22 of the sealing lip 1 extends from the joint 12 initially at approximately 20° towards the space 32 to be sealed, as far as to the tension element 3. Then, the imaginary connection plane 17 extends at a relatively large angle 19 of approximately 45° to the axis of symmetry 18.

Starting from the joint 12, the radial width of the joint space 14 continuously increases axially towards the space 32 to be sealed. Even highly viscous media to be retained cannot remain inside the open joint space 14 and are constantly discharged therefrom towards the space 32 to be sealed. Therefore, during the proper use of the sealing ring, the joint space 14 is practically free of medium to be retained, as shown in FIG. 1.

In FIG. 2, the sealing ring differs from the sealing ring of FIG. 1 only in that the joint space 14 is substantially completely filled by a closed-cell foam member 26.

Starting from the open front end 33 of the foam member 26, the joint space 14 continuously axially widens in its radial extension along the connection plane 17 towards the space 32 to be sealed.

The two machine elements 29, 30 are each shown in FIGS. 1 and 2 by dash-dot lines.

The sealing ring according to the invention is shown in both FIGS. 1 and 2 in its form required for manufacture.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. A sealing ring, comprising:
    a support body;
    a dynamically loaded sealing lip having a sealing edge disposed on a first side and a mounting groove disposed on a second side facing radially away from the first side; and
    a tension element disposed in the mounting groove and configured to stabilize the sealing lip in the radial direction,
    wherein the mounting groove includes a mounting opening on the second side delimited by a first guide web and a second guide web disposed adjacent to the first guide web and spaced in an axial direction,
    wherein the sealing lip is articulated, on a third side facing axially away from the sealing edge, to the support body using a joint,
    wherein the second side of the sealing lip faces radially toward a first side of the support body so as to delimit a substantially C-shaped joint space therebetween,
    wherein the substantially C-shaped joint space is formed between a surface on the second side of the sealing lip and a surface on the first side of the support body that radially face each other, the substantially C-shaped joint space being open on a side facing in the axial direction,
    wherein the first guide web, axially facing the joint, has a first diameter,
    wherein the second guide web, facing axially away from the joint, has a second diameter,
    wherein the first diameter is larger than the second diameter,
    wherein, starting from the joint, a diameter of the surface on the second side of the sealing lip radially facing the surface on the first side of the support body becomes continuously smaller in an axial direction to the first guide web, and
    wherein, when viewed perpendicularly to the radial plane, the substantially C-shaped joint space is, from the joint to a line extending through the first guide web and perpendicular to the axial direction, substantially symmetrical in a radial direction.

2. The sealing ring of claim 1, wherein, when viewed in a section through the sealing ring, the first guide web and the second guide web are each connected on a respective outer circumference by an oblique, imaginary connection plane, and
    wherein the connection plane encloses an angle of between 30° and 60° with an axis of symmetry of the sealing ring.

3. The sealing ring of claim 1, wherein the surface on the second side of the sealing lip and the surface on the first side of the support body that radially face each other include a friction-reducing surface profiling, a friction-reducing surface coating, or both.

4. The sealing ring of claim 1, wherein the substantially C-shaped joint space is substantially completely filled by a foam member between the surface on the second side of the sealing lip and the surface on the first side of the support body that radially face each other.

5. The sealing ring of claim 4, wherein the foam member includes a closed-cell foam.

6. The sealing ring of claim 1, wherein the sealing edge is defined by two intersecting conical surfaces.

7. The sealing ring of claim 1, wherein the tension element is formed as an annular spiral coiled spring.

8. The sealing ring of claim 1, wherein, except for the tension element, the sealing ring is formed in one piece and of one material.

9. The sealing ring of claim 1, wherein, except for the tension element, the sealing ring includes an elastomer material, and
    wherein the support body includes a woven fabric sheathing.

10. A method of retaining grease, the method comprising:
contacting the sealing ring of claim 1 with grease.

11. The sealing ring of claim 4, wherein the foam member consists of a closed-cell foam.

12. The sealing ring of claim 1, wherein the tension element includes an annular spiral coiled spring.

13. The sealing ring of claim 1, wherein, except for the tension element, the sealing ring consists of an elastomer material, and
   wherein the support body includes a woven fabric sheathing.

\* \* \* \* \*